Feb. 5, 1935.  H. L. RAABE  1,989,823
SPRING CLAMP
Filed Jan. 5, 1932  3 Sheets-Sheet 1
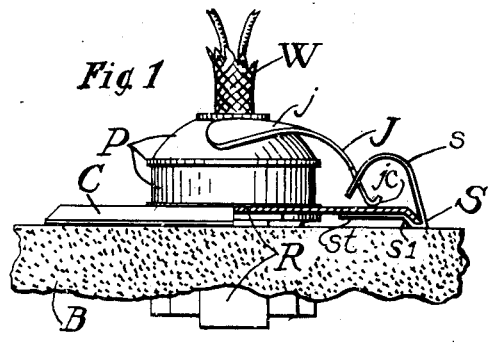
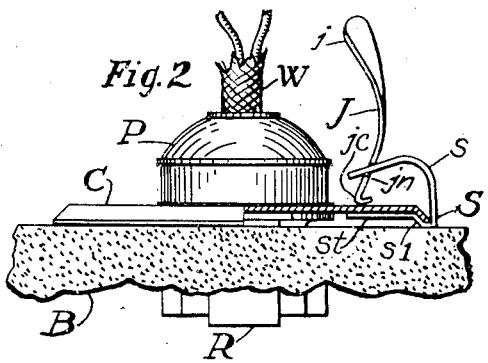
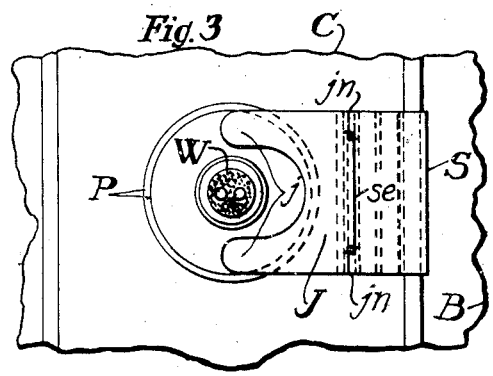
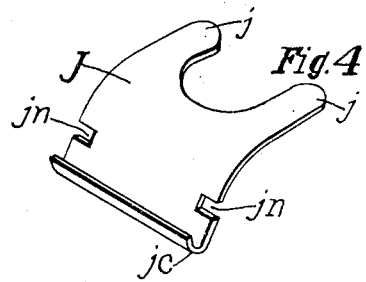
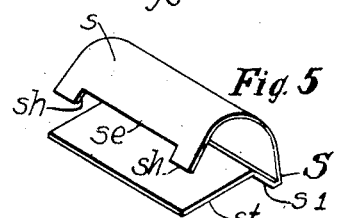
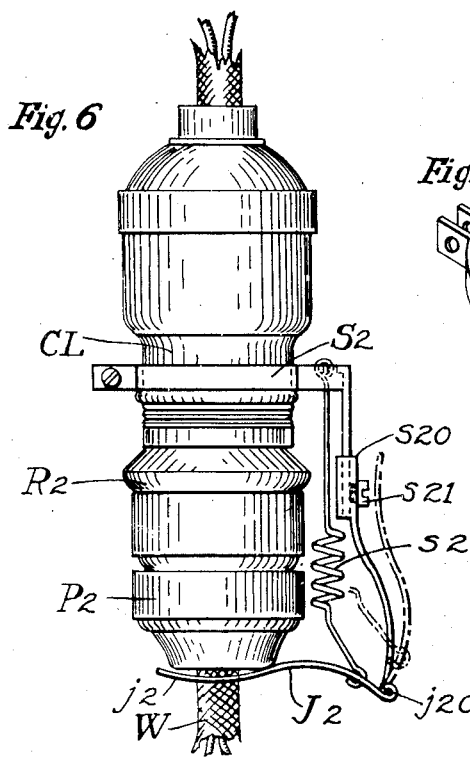
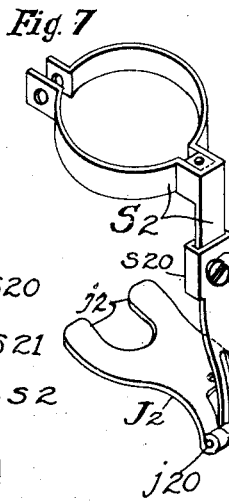
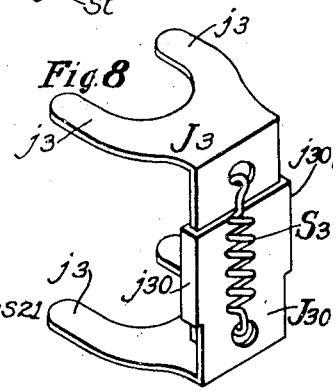
Inventor
Herbert L. Raabe.
By Sterling P. Buck.
Attorney Feb. 5, 1935. H. L. RAABE 1,989,823
SPRING CLAMP
Filed Jan. 5, 1932 3 Sheets-Sheet 2
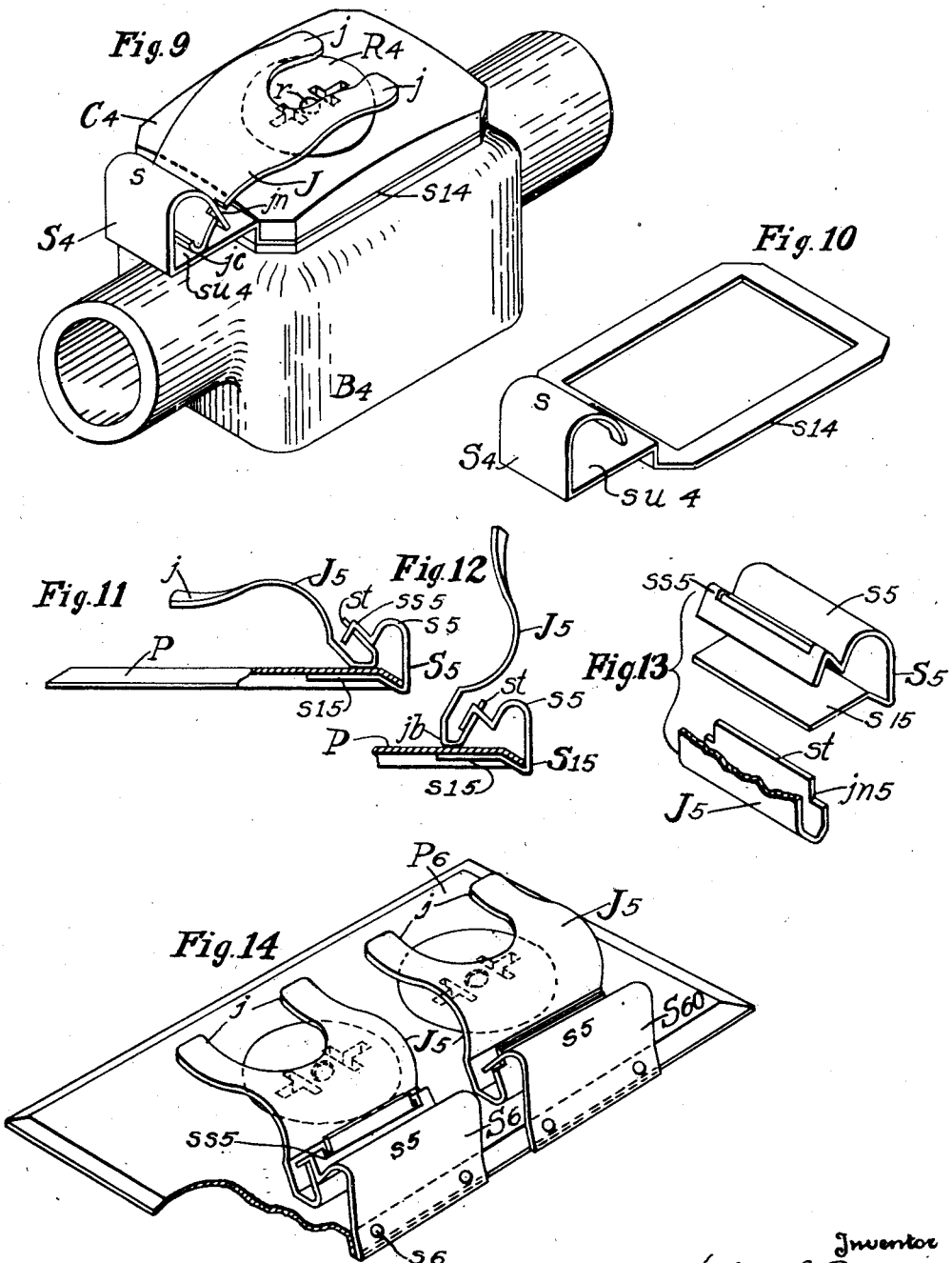

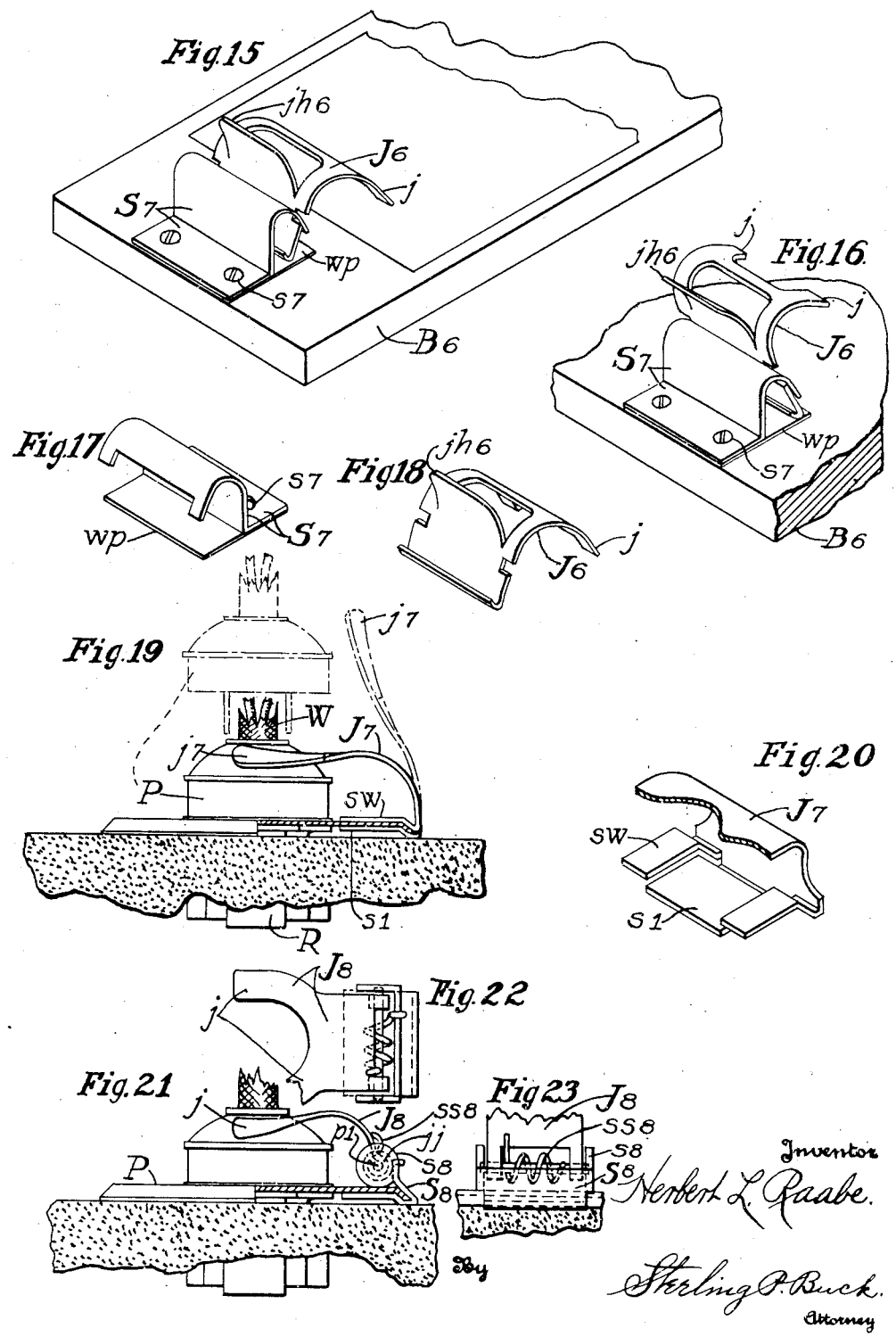

UNITED STATES PATENT OFFICE 1,989,823

SPRING CLAMP

Herbert L. Raabe, Baltimore, Md.

Application January 5, 1932, Serial No. 584,883

5 Claims. (Cl. 173—328)

This invention relates to spring clamps, and especially to an improved compensating spring clamp.

One object of this invention is to provide a compensating spring clamp which is especially useful in connection with electric conductors which include a plug of the type which is inserted in a receptacle by recti-linear movement, in contradistinction to the screw-type plugs which have become obsolescent with respect to many industrial uses.

Another object is to provide a spring clamp which applies a sufficient resistance on the electric plug to prevent it from being withdrawn from the receptacle by a moderate or excessive strain upon the conducting cable; but which pressure is less than that which is sufficient to break the conducting cable or to pull it from its anchorage within the plug.

Another object is to provide a spring clamp of this character which can be quickly, easily and cheaply formed, assembled and installed, and which is thoroughly practical, convenient and efficient for the purpose mentioned and for other purposes which will be mentioned hereinafter.

Other objects and important features are pointed out or implied in the following details of description, in connection with the accompanying drawings in which:

Figure 1 is a view showing one form of my invention in side elevation, applied to an electric plug and cover-plate of a plug receptacle, the receptacle being mounted on a base which is shown in section, a part of the cover-plate also being in section.

Figure 2 is a view similar to Figure 1, but showing the spring clamp open.

Figure 3 is a top plan view of the structure shown in Figure 1.

Figure 4 is a perspective view of the bifurcated clamping jaw shown in Figures 1, 2 and 3.

Figure 5 is a perspective view of the spring element which constitutes a holder for the member shown in Figure 4.

Figure 6 is a view showing a modified form of the invention applied to a lamp socket of the screw-type having a screw-type plug receptacle fitted therein, and a plug in the plug-receptacle.

Figure 7 is a perspective view of the spring clamp shown in Figure 6, except the spring being omitted.

Figure 8 is a view of another modified form somewhat similar to the ones shown in Figures 6 and 7, for serving a similar purpose and other purposes.

Figure 9 shows another modified form of the invention applied on a plug receptacle of a rigid conduit condulet body of a type shown in a catalogue of the General Electric Company.

Figure 10 is a perspective view of the combined spring and securing member shown in Figure 9.

Figure 11 is a side elevation of another form of the invention applied on a cover-plate similar to the ones shown in Figures 1 and 2.

Figure 12 is a view showing the same spring clamp as shown in Figure 11, but in the open position.

Figure 13 is a perspective view showing the two spring clamp elements that are shown in Figures 11 and 12, separated from one another, a part of the bifurcated clamping jaw being broken off.

Figure 14 is a perspective view showing a spring clamp similar to the ones shown in Figures 11 and 12, but slightly modified as to the manner of securing the springs to the cover plate or receptacle-plate which (in this instance), has two receptacles fitted therein.

Figure 15 is a perspective view which shows another modified form of invention applied as part of a paper clamp for holding letters, etc.

Figure 16 is a perspective view of the device shown in Figure 15, but showing a smaller part of the base, and showing the clamp held open by the same spring action which holds it closed.

Figure 17 is a perspective view of two of the elements shown in Figure 15, these elements being reversed for the purpose of showing them more clearly than shown in Figure 15.

Figure 18 is a perspective view of the bifurcated clamping jaw shown in Figures 15 and 16.

Figure 19 is a view similar to Figures 1 and 2, but showing the securing element and bifurcated spring jaw formed integrally of a single blank of sheet metal or other appropriate springy material.

Figure 20 is a perspective view of the spring clamp shown in Figure 19, a part being broken away for showing the other parts more clearly.

Figure 21 is a view similar to Figures 1 and 2, but showing a modified form.

Figure 22 is a top-plan view of the spring clamp shown in Figure 21, one of the prongs or furcations being broken off.

Figure 23 is a view taken at right angles to Figure 21, to more clearly show the relation of the spring to the bifurcated jaw and the other parts of the device.

Referring to these drawings in detail, in which similar reference characters correspond to similar parts in the several views, the invention is now described in detail as follows:

The general purpose of this invention is to provide a spring clamp which effectively holds an electric plug or other member in place against a moderate pulling strain or tendency to dislodge the plug or member, so that it will not become accidentally displaced by such moderate pull against the plug; but which will yield if the pull or pressure becomes excessive, so that the conducting wire cable will not be disconnected or loosened; whereby, the danger resulting from disconnected conducting wire ends is eliminated. This purpose can be accomplished by any one of the devices shown in the different modified forms here illustrated. For a very simple and effective form of the invention, attention is now directed to Figures 1, 2, 3, 4 and 5, where the electric plug P is shown fitted in the plug receptacle R, said receptacle being fitted in a wall or base which is indicated at B, this base or wall B having a cover or receptacle plate C secured thereon by screws or other appropriate means. In this form of the invention, the combined securing member and actuating spring is indicated at S. The member $s$ includes an arched spring portion provided with shoulders $sh$ and an intermediate bearing edge $se$. The lower part of the member S is formed with an inclined part $si$ which fits against the inclined flange of the cover plate, and, with a tensioning extension $st$ which fits against the under side of the cover plate and combines with the spring $s$ for effecting the tension of the latter against the jaw J.

The jaw or clamping plate J is bifurcated so as to provide spaced jaw members $j$ which rest and press on opposite sides of the wire containing opening in the outer side of the plug, that is, on opposite sides of the apertured central part of the plug and of the conducting wire cable W, on the side opposite to that which enters the receptacle. It is seen, therefore, that the pressure is applied where it affords the maximum resistance to the displacement of the plug from the plug receptacle. The jaw J is also provided with opposite notches $jn$ to receive the shoulders $sh$ of the member S. The part between the shoulders $jn$ rests against the edge $se$, while the curved lower part $jc$ rests on the cover or plate C. Because of this relation of the members S and J, and because of the downward pressure of the edge $se$, the jaw members $j$ are held firmly and yieldingly against the plug P for preventing accidental displacement of the plug. However, if an excessive pull is applied on the wire cable W, the clamping jaw J will yield to such pressure while turning about the edge $se$ in such relation that it tends to assume the position shown in Figure 2, thereby permitting the plug to be pulled straight from the plug socket without detriment thereto or to the cable W. This and other forms of the invention are compensating so as to effectively adjust themselves to the different shapes and sizes of socket plugs, as will be very obvious from a careful inspection of the drawings. Moreover, at least this form of the invention is capable of being swung past the center of pressure, so that the spring $s$ holds the jaw J in the wide-open position shown in Figure 2, thereby permitting the plug to be inserted without interference of the spring clamp.

In Figure 6, the spring clamp is applied in connection with a lamp socket having a plug receptacle screwed thereinto, this receptacle being of the type which receives the plug by pushing the latter straight thereinto, instead of screwing it in; that is, the plug and socket connection is similar to that shown in Figures 1, 2 and 3; but inasmuch as the receptacle is connected with the lamp socket instead of with the plate C, a different type of securing and spring pressing member is provided for this different form of mounting for the receptacle. In this form, the lamp socket is indicated at CL, the receptacle at R2, and the plug at P2. The securing member is indicated at S2, the spring at $s2$, the jaw at J2, having furcations $j2$; and in this form, the device is compensating in the respect previously mentioned, and also adjustable by means of a sliding connection $s20$ and a set-screw $s21$. The member J2 is pivoted at $j20$, this pivotal connection being preferably in the form of a hinge, as shown in Figure 7. A slot $s22$ is provided in the lower part of the member S2, so that the jaw J2 can swing on its hinge $j20$ to the broken line position while the lower part of the member $s2$ passes through this slot $s22$; so it is seen that the effect and function of this device is the same as explained regarding Figures 1 and 2, and that the spring action holds the jaw J2 both closed and in the wide-open position.

Referring to Figure 8, it is seen that two bifurcated clamping jaws J3 and J30 are slidingly connected to one another, one of these jaws being provided with over-turned flanges $j30$. The furcations of these jaws are indicated at $j3$. A contracting spring S3 has its upper and lower ends engaged respectively with the jaws J3 and J30, and renders them compensating, at the same time exerting a spring action sufficient to hold a plug in its receptacle against moderate pressure.

Referring to Figure 9, wherein the invention is applied on a rigid conduit condulet body, it is seen that this body corresponds to the base of Figure 1, so the reference character B4 is applied thereto. For a similar reason, the reference character C4 is applied to the cover plate or "conduletto". The receptacle is substantially the same as previously described, but having a central opening $r$ for receiving a screw which holds it and the cover plate or "conduletto" in place. This receptacle is indicated at R4. The clamping jaw is substantially the same as previously described, and is indicated at J, having jaw elements or furcations $j$ and the other parts described in connection with Figures 1 and 4. The combined securing and spring pressing member is indicated at S4, its upper part $s$ and the part which engages with the jaw being the same as in Figure 1. Its lower part includes a plane surface $su4$ which corresponds to the part $st$ of Figure 1, so that the operation and function of this form is the same as that of Figure 1. However, as shown in Figure 10, its lower part $s14$ is in the form of an open frame which receives the lower part of the cover plate C4 and is held between such cover plate and the body B4. This part $s14$ may be seated either upon or under the gasket which is here shown and which is usually between the body and the cover plate or "conduletto". This part $s14$ may properly be termed an adapter plate, and may be of any desired shape for fitting the different forms of condulet bodies. The member shown in Figure 10 may be formed of a single blank of sheet metal, or of other material, or of several primarily separate parts united by any appropriate means.

The form of spring clamp shown in Figures 11, 12, 13 and 14 is different from that of Figures 1 to 5, inclusive, in several respects, and is adapted for being applied to a plate P such as shown in Figures 1 to 5. The combined securing member and spring S5 includes the arched spring s5, the lower securing element s15, a slotted part ss5 having adjacent stop-surfaces for a purpose which will presently be explained. The compensating jaw J5 has the furcations j such as shown in Figure 1, and has notches jn5 on opposite sides of the intermediate part or tongue st which extends through the slot of the part ss5. The member J5 is bent at jb to provide an element similar to that shown at jc in Figure 4. The operation of this form of invention will be clearly understood upon reference to Figures 11 and 12 which show the spring s5 holding the jaw J5 in the operative and inoperative positions.

Referring to Figure 14, it is seen that the general construction is the same as in Figures 11 to 13 inclusive, except the lower parts of the members S6 and S60, these lower parts being apertured to receive rivets s6 which extend through one of the flanges of the plate P6. The operation of this form of the invention is the same as in the previously described forms of Figures 1, 11 and 12.

In Figure 15, the spring-member S7 is the same as shown in Figure 1 with the exception of having its lower part apertured at s7 for receiving screws which also extend through a wear-plate wp into the base B6. The jaw J6, having the furcations j is the same as shown in Figure 1 with the exception of having a handle jh6. This handle is preferably formed integrally with the other parts of the jaw J6, the same being struck up from the intermediate part thereof. By means of this handle, a finger or thumb of the user can hold the jaw open or partly open while a piece of paper or other object is inserted under the jaw for being pressed against the base B6. Although this jaw J6 is formed for holding the piece of paper, its furcations j are of importance, for they engage the paper at points spaced from one another so as to prevent it from pivotally shifting under the influence of a current of air or other influence. It is clearly within the scope of this invention to form the jaw with a slighter curvature, thereby adapting it for engagement with a plug as shown in Figures 1 to 3, 19 and 21. In Figure 16, this form of the invention is shown held wide open by means of the same spring which holds it shut.

In Figure 19, the plug P is shown in full lines in connection with the plug receptacle, and in broken lines disconnected from the receptacle. In this disconnected position, the corresponding position of the jaw J7 is also shown in broken lines, while in the full-line position, the furcations j7 are shown on the plug P in the position for yieldingly holding it. Instead of this form constituting two parts which are substantially pivotally connected (as in Figures 1, 9 and 15), the securing elements s1 and sw are formed integrally with the spring-jaw J7. In this form of the invention, it is essential that the material be comparatively thin and highly resilient, so that it will bend from the full-line position to the broken-line position and then return to its former effective position.

In Figures 21, 22 and 23, the jaw J8, having the furcations j, has its lower end curved into a hinged joint jj. A pintle pi extends through this hinge joint and terminates in apertured ears s8 of the securing member S8. This pintle also extends through a helical spring ss8. This spring has its ends bearing, respectively, against the jaw J8 and securing member S8, so that the jaw J8 is pressed by this spring instead of by its inherent elasticity or resilience. The member S8 may be secured to the plate P by the means shown, or by any other appropriate means, whether illustrated in these drawings or not.

From the foregoing, it will be seen that each of these forms of spring clamps is distinguished from the prior art by the fact that the clamping jaws are yieldable and compensating with respect to the plug or other object being held thereby, and that most every illustrated form of the invention includes a jaw which is substantially pivotally mounted on a spring which serves to hold the jaw in the closed or clamping position and also in the open out-of-the-way position which permits the plug to be moved straight to the receptacle and pushed straight thereinto without interference of the clamping jaw.

Although I have described these embodiments of my invention very specifically, I have no intention of limiting my patent protection to these exact details of construction and arrangement, for the invention is susceptible of numerous changes and other modifications within the scope of the inventive ideas as implied and claimed.

What I claim as my invention is:

1. In a spring clamp for holding in place a push-type electric connecting plug having conducting wires and having an opening for containing these wires, the combination of a jaw including furcations to engage with the outer side of said plug at opposite sides of said opening in which the conducting wires are contained, and a combined spring and securing member provided with means to unite it with a base associated with said plug, said jaw having means to movably secure it to the spring of said combined spring and securing member in such cooperative relation that the jaw is normally spring-pressed upon opposite sides of the opening in said plug and is yieldable so as to be swung back for permitting the plug to be displaced when excessive pressure is applied by movement of said plug against said furcations.

2. The combination with a push-type electric connecting plug and a base associated therewith, of a combined spring and securing member united with said base and having spaced shoulders, and a jaw provided with notches and with a part between the notches normally fitted between the said spaced shoulders and pressed towards said base by the spring element of said combined spring and securing member, said jaw being provided with means to cooperate with said spring element for pressing said jaw upon said plug while permitting said jaw to swing with respect to said spring and securing member so as to permit said plug to become displaced from said base when excessive pressure moves said plug outward.

3. In a spring clamp for holding a push-type electric plug, the combination of a base including a substantially smooth plate, a combined spring and securing member united with said plate and having an arched part provided with spaced shoulders substantially over said plate and spaced therefrom, and a jaw comprising a plate having opposite notches which receive said shoulders while the parts between said notches and between said shoulders engage with one another for substantially forming a pivotal connection, said jaw having a substantially smooth part held against the first said plate by said substantially pivotal connection and being movable thereon for holding said jaw in a clamping position and also in a non-clamping position, substantially as specified.

4. In a spring clamping device for holding a push-type electric plug in a receptacle, the combination with said plug and receptacle and with a base which holds the receptacle; of a combined securing and spring-pressing member including a holding element engaging with said base for securing said holding element in its effective position, a jaw having a substantially pivotal connection with said holding element and having furcations properly constructed and positioned for engagement with spaced points at proper positions on the outer side of said electric plug, and an element including a spring and engaging with the said holding element and jaw and urging the jaw against the plug for holding the plug in the receptacle while being yieldable against excessive pressure by outward movement of the plug from the receptacle so as to permit displacement of the plug upon being subjected to the excessive pressure predetermined.

5. The structure defined by claim 4, said combined securing and spring-pressing member being provided with adjusting means for increasing its spring tension substantially as specified.

HERBERT L. RAABE